Patented Dec. 12, 1944

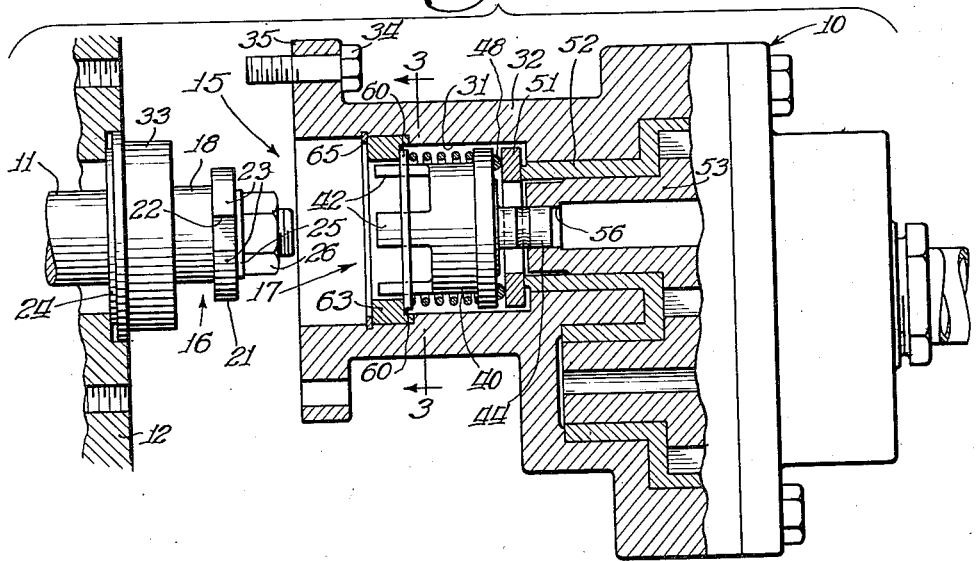

2,365,146

UNITED STATES PATENT OFFICE 2,365,146

PUMP SHAFT SEAL ASSEMBLY

Edmund F. Wichorek, Cleveland, Ohio, assignor to Pesco Products Co., a corporation of Ohio Application February 16, 1942, Serial No. 431,063

6 Claims. (Cl. 286—7)

This invention relates to flexible torque transmitting couplings generally and particularly to a coupling arrangement having special application to the problem of driving an auxiliary unit such as a pump from an auxiliary power shaft of an aircraft engine.

Considerable difficulty has been encountered in providing a suitable coupling arrangement between, for example, the auxiliary power shaft of aircraft engines and the rotor or gear of an auxiliary pump required to be driven from the motor. This difficulty has been found to be due in part to the particular conditions under which the coupling must operate in such service and in part to the unsatisfactory arrangement for installing the coupling in torque transmitting relationship with the auxiliary power shaft. The latter aspect is rendered particularly significant by the fact that the aircraft motor generally must be shipped to a point of assembly separately from the auxiliary unit such as the pump which it is desired to later install in torque transmitting relation to the auxiliary motor shaft.

It is therefore an object of the present invention to provide an improved coupling arrangement of the above type which is practical of manufacture, efficient in its operation, and which is capable of ready connection and disconnection with reference to the shaft with which the same is to be associated in torque transmitting relation. It is a further object to provide a coupling of the above type which is connectible in torque transmitting relation without requiring any further mechanical operation than the mere attachment of the coupling housing to the housing supporting the shaft to which connection is to be made. It is a more specific object to provide in a coupling of the present type a novel arrangement of elements functioning as above pointed out and incorporating the necessary features of flexibility as well as the necessary seal against the inadvertent flow of lubricant therepast.

Other more specific objects, advantages and uses of my invention will become more apparent from a reading of the following specification taken in connection with the accompanying drawing which forms a part thereof and wherein:

Fig. 1 is a partially exploded view in axial cross section bringing out to advantage one preferred embodiment of my invention;

Fig. 2 is a somewhat enlarged view in axial cross section of the principal portion of the same structure shown in Fig. 1 but with the exploded parts brought together in assembled relation; and Fig. 3 is a cross sectional view taken substantially on the line 3—3 of Fig. 1.

Referring in greater detail to the figures of the drawing, I have disclosed my invention as applied to the problem of connecting in torque transmitting relation a gear type oil pump indicated generally at 10 and an auxiliary power shaft 11 extending from an aircraft motor housing indicated at 12. My improved coupling arrangement is indicated generally at 15 and is composed essentially of two readily connectible and disconnectible coupling sub-assemblies indicated generally at 16 and 17.

Coupling sub-assembly 16 is arranged to be mounted on and carried by auxiliary power shafts 11 permanently, in the sense that this installation may be made at the factory where the aircraft motor is fabricated and where shaft 11 is normally installed in housing 12. The installation of sub-assembly 16 may be made at any other suitable time before or after the shipment of the aircraft motor, as for example at an intermediate point of shipment and assembly. Coupling sub-assembly 16 is shown as comprising a tubular sleeve member 18 formed with axially extending internal splines 19 for cooperation with complementary splines 20 on shaft 11 for preventing relative rotation therebetween and provided externally with a radially outwardly extending flange 21 interrupted by a plurality of splines or finger receiving recesses 22 about the periphery thereof separated by intervening arcuate lugs or protuberances 23, all for a purpose to be pointed out. The sleeve 18 may be permanently confined on shaft 11 with the inner end thereof held against the shaft roller bearing assembly 24 by a lock washer 25 and a nut 26, which installation, as pointed out, may be made at any suitable time independently of sub-assembly 17.

The second cooperating coupling sub-assembly 17 is mounted for rotation within the bore 31 of a housing 32, which may be an integral part of the pump 10, the open end of bore 31 being arranged for reception in embracing relation about the end of shaft 11 and about bearing assembly 24, an adapter 33 being used where necessary to effect a fit and the housing 32 being arranged for attachment to housing 12 as by cap screws 34 passing through radially outwardly extending flange 35. Coupling sub-assembly 17 is shown as being composed of a tubular or cup-like member 40 closed as indicated at 41, terminating at the open end in a plurality of peripherally spaced axially extending coupling fingers 42 and formed exteriorly of the closed portion thereof with a shear neck 43 connecting with a transverse coupling lug 44. Opposite the closed portion of tubular member 40 is a radially outwardly extending flange 45 adapted to receive one end of a coil compression spring 46 in engagement with the side thereof facing the open end of bore 31 and formed on the opposite side thereof with an annular channel 47 adapted to partially receive a flexible seal ring 48. Coupling member 40 is further formed with a cylindrical shoulder 49 embraced by a separate bearing ring 51 engaged by flexible seal ring 48 for urging the ring 51 into intimate contact with the end of bearing sleeve 52, which in turn supports the gear extension 53 in journalled relation. This pump gear extension is formed with a transverse slot 56 recessed in the end thereof for coupling reception of transverse tongue 44.

For confining coil compression spring 46 against flange 45 a washer-like ring 60 embraces tubular coupling member 40 about fingers 42 intermediate the axial extremities thereof. Splines or recesses 61 are preferably formed in the inner periphery of ring 60 complementary in shape and disposition to fingers 42 serving thus to prevent relative turning between the ring and tubular member 40 as well as to improve the guided axial movement therebetween.

For the important purpose of limiting the axial movement of ring 60 in the direction of the open end of bore 31 during shipment of the pump assembly or otherwise prior to such time as it is desired to install the pump assembly on housing 12, there is provided within bore 31 a radially inwardly extending stop or spacer ring 63 having a smaller internal bore than the outside diameter of ring 60. This stop ring 63 is confined against shoulder 64 in bore 31 by means of a split expandible retainer ring 65.

From the above it will thus be made clear that by merely moving pump 10 into position for attachment to motor housing 12 the necessary coupling for transmission of torque will be effected without requiring any further mechanical operation, it being seen from Figs. 1 and 2 that fingers 42 pass into cooperation with recesses or finger receiving openings 22 while the intervening protuberances or arcuate lugs 23 engage the spring confining ring 60 moving the same axially away from the spacer ring 63 and additionally compressing spring 46 the desired amount for effecting in combination with sealing ring 48 the necessary flexibility and sealing relationship. It is desired to additionally point out the fact that sealing rings 48 as well as compression coil spring 46 have been disposed purposely as far as practicable away from the principal axis of rotation with the result that the operating characteristics of the coupling are greatly improved, having particular reference to the elimination of cocking unavoidably present in installations wherein these elements are placed close to the principal axis of rotation.

It will be understood that the disclosure of my invention as applied to a gear type pump, while believed to have particular application thereto, is by way of example and that my invention may be employed wherever a similar problem of coupling exists. Likewise, while the coupling housing 32 is shown as an integral part of the pump housing the same may in certain installations be a separate housing.

Other equivalent changes and applications may be made coming within the broader aspect of my invention, and it is intended that my invention be defined by the appended claims which should be given a scope as broad as consistent with the prior art.

I claim:
1. A flexible rotary coupling arrangement including a first housing having a shaft journalled therein and protruding therefrom, a first rotary coupling sub-assembly fixed on said shaft and normally retained thereon, a second housing formed with a bore therein containing a second rotary coupling sub-assembly normally confined therein, said second housing being provided with means for attaching the same to said first housing with said bore embracing said shaft and first named sub-assembly, said sub-assemblies each being formed with interfitting elements operable in response only to the movement of said second housing into mounting position on said first housing to bring said interfitting elements into torque transmitting relation, said second coupling sub-assembly comprising a rotary tubular member, a coil compression spring embracing said tubular member, a flange extending radially from said tubular member and engaged by one end portion of said compression coil spring, means within said bore for confining said spring against said flange under limited compression when said coupling sub-assemblies are in disassembled relation, said means being responsive to the movement of said sub-assemblies into torque transmitting relation to move said coil compression spring away from said confining means and further compress the same in the direction of said flange a predetermined amount.

2. A flexible rotary coupling arrangement adapted for drivably connecting the rotary element of an auxiliary unit to a shaft protruding from and carried by a first housing also adapted to support said unit, said flexible coupling arrangement comprising a first coupling sub-assembly normally permanently fastened on said shaft against relative movement with reference thereto, said auxiliary unit including a second housing formed with a bore open at the outer end for reception about said shaft and first named sub-assembly, means for attaching said second housing to said first housing, means defining a second coupling sub-assembly rotatably carried within said bore, said coupling sub-assemblies each comprising complementarily formed interfitting elements brought into torque transmitting relation in response only to the movement of said second housing into mounting position on said first housing said means including a coil compression spring effective to take up end play between said sub-assemblies, means including a protuberance extending radially inwardly from said housing bore for limiting the outward axial movement of one terminal of said spring when said coupling sub-assemblies are out of cooperative relation, said interfitting elements carried on said shaft assembly being effective upon being brought into cooperation with said interfitting elements on said housing sub-assembly to compress said spring a predetermined amount axially away from said confining protuberance.

3. A flexible rotary coupling arrangement including a housing formed with a bore therein open at least at one end, a tubular torque transmitting member within said bore formed on the end portion thereof facing the open end of said bore with a plurality of circumferentially disposed axially extending fingers and a radially outwardly extending flange spaced axially from said fingers, a washer-like ring embracing said tubular member about said fingers intermediate the axial extremities thereof, a coil compression spring interposed between said flange and washer-like ring in embracing relation to said tubular member, stop means extending radially inwardly from the wall of said bore functioning to limit the axial movement of said washer-like ring in the direction of said open end of said bore, means interposed between said flange and said housing including a flexible seal ring, a second tubular member adapted to be normally permanently fastened on a shaft protruding from a second supporting housing, said second tubular member being formed with circumferentially disposed radially extending protuberances arranged to interfit with said fingers on said first tubular member, said protuberances being operable to engage said ring and move the same away from said limiting means compressing said spring a predetermined amount in response only to said protuberances being moved into torque transmitting relation with said fingers and means for removably attaching said housings together with said tubular members in torque transmitting relation.

4. A flexible rotary coupling arrangement adapted for drivably connecting a rotary assembly, including a housing and a rotary element to an auxiliary power shaft protruding from and carried by a motor housing, said last named housing being adapted to support said rotary assembly, said flexible coupling arrangement comprising a first coupling sub-assembly to be normally permanently fastened in fixed torque transmitting relation on said auxiliary power shaft, said coupling including said second housing formed with a bore therein open at the outer end for reception of said auxiliary shaft and first named sub-assembly, means for attaching said first named housing to said motor housing, means defining a second coupling sub-assembly rotatably carried in normal permanent relation with said rotary element within said bore, said first coupling sub-assembly comprising a first sleeve or tubular member including means for normally fastening the same on said shaft in torque transmitting relation thereto, said first named tubular member being formed with protuberances extending radially outwardly in spaced circumferential relation, said second coupling sub-assembly comprising a second tubular-like torque transmitting member rotatably confined within said bore and formed on the end portion thereof facing the open end of said bore with a plurality of circumferentially spaced axially extending fingers for complementary reception between said protuberances for effecting torque transmitting relation therebetween, said second named tubular member being further formed with a radially outwardly extending flange spaced axially from said fingers, a washer-like ring embracing said tubular member within said bore about said fingers intermediate the axial extremities thereof, a coil compression spring interposed between said flange and said washer-like ring in embracing relation to the outer periphery of said tubular member, stop means extending radially inwardly from the wall of said bore functioning to limit the axial movement of said washer-like ring in the direction of said outer end of said second housing bore, means interposed between said flange and said housing including a flexible seal ring, whereby the movement of said first named housing into mounting position on said motor housing is effective to bring said protuberances forming a part of said first named tubular member into torque transmitting cooperation with said fingers forming part of said second named tubular member, said protuberances being further effective to engage said washer-like ring compressing said spring a predetermined amount to thus provide the desired flexibility and fluid seal.

5. In a flexible coupling and seal arrangement adapted to facilitate ready installation and removal, including means defining a main housing having a power shaft protruding therefrom, means defining a first coupling subassembly adapted to be mounted permanently about the terminal portion of said protruding power shaft and comprising means for fastening the same to said shaft against relative movement with reference thereto, said first subassembly further including at least one radial protuberance, a second auxiliary housing having means for attaching the same to said main housing and formed internally with a coupling subassembly bore, said bore arranged to be embracingly received about said first coupling subassembly, a second coupling subassembly arranged to be permanently carried within said bore and comprising a rotary member having a complementary recess for receiving and drivingly cooperating with said radial protuberance extending from said first named coupling assembly, sealing means between said rotary member and said auxiliary housing, and means including a coaxially disposed helical compression spring effective to retain said coupling subassembly within said auxiliary housing bore and hold said rotary member in engagement with said seal at such time as said auxiliary housing is disconnected from said main housing, the movement of said auxiliary housing into installing position being effective to bring said first named subassembly into cooperation with said retaining means and spring to compress said spring axially for loading the same a predetermined amount.

6. In a flexible rotary coupling arrangement including means defining a first housing having a rotary shaft journalled therein and protruding therefrom, a first coupling sub-assembly carried on said protruding portion of said shaft and comprising means for normally retaining the same in fixed relation to said shaft; means defining a second housing formed with a bore therein adapted to be received in embracing relation about said protruding portion of said shaft, means for fastening said second housing to said first housing, a second coupling sub-assembly received within said bore of said second housing for rotation therein, means for retaining said coupling sub-assembly within said bore, each of said sub-assemblies being further provided with complementary interfitting elements effective to connect the same in torque transmitting relation in response to the movement of said second housing into position for fastening the same to said first housing, said second coupling assembly further comprising an axially disposed coil compression spring effective to apply axial separating pressure between said sub-assemblies to control end play therebetween and means responsive to said movement of said second housing into fastening position with respect to said first housing effective to apply a predetermined loading to said coil compression spring.

EDMUND F. WICHOREK.